(No Model.)

H. W. O'NEILL & L. T. HAILE.
TIRE FOR BICYCLES.

No. 551,471. Patented Dec. 17, 1895.

Witnesses
E. J. Fotheringham
G. F. Downing.

Inventors
H. W. O'Neill and
L. T. Haile
By H. A. Seymour
Attorney

UNITED STATES PATENT OFFICE.

HENRY W. O'NEILL AND LUTHER T. HAILE, OF DENVER, COLORADO.

TIRE FOR BICYCLES.

SPECIFICATION forming part of Letters Patent No. 551,471, dated December 17, 1895.

Application filed January 5, 1894. Serial No. 495,848. (No model.)

*To all whom it may concern:*

Be it known that we, HENRY W. O'NEILL and LUTHER T. HAILE, citizens of the United States, residing at Denver, in the county of Arapahoe and State of Colorado, have invented certain new and useful Improvements in Tires for Bicycles, &c.; and we do hereby declare the following to be a full, clear, and exact description of the invention, such as will enable others skilled in the art to which it appertains to make and use the same.

Our invention relates to an improvement in tires and more particularly to that class known as "pneumatic tires," adapted for use on velocipedes, sulkies, &c., the object of the invention being to so construct a pneumatic tire comprising a series of connected compartments that all of said compartments can be inflated simultaneously and so that the inlets to said compartments can be simply, quickly and simultaneously closed when the compartments of the tire shall have been inflated to the desired extent.

With these objects in view the invention consists in certain novel features of construction and combinations and arrangements of parts, as hereinafter set forth and pointed out in the claim.

Figure 1:
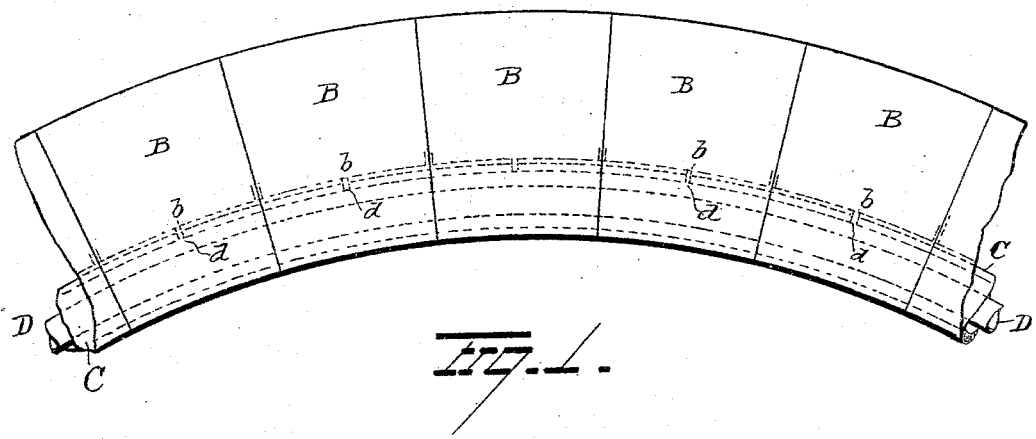
Figure 2:
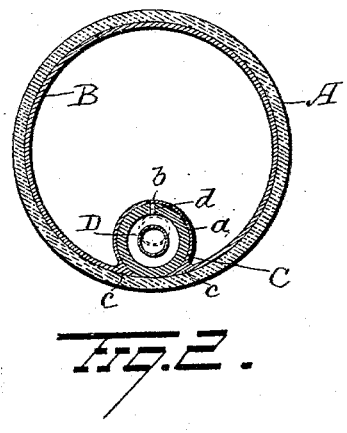

In the accompanying drawings, Figure 1 is a view of a portion of a tire partly broken away, illustrating our improvements. Fig. 2 is a sectional view.

A represents a hollow rubber tube or tire, in which a number of connected or disconnected elastic compartments or cells B are located. Each compartment or cell B is provided at its bottom with an indentation or chamber $a$ having a perforation $b$ which communicates with the interior of the compartment. At the point on the compartment or cell where the indentation is made, it is preferably reinforced at $c c$. When all the compartments or cells B are in place the indentations or chambers $a$ of all of said compartments will be in alignment, thus producing a continuous annular chamber or receptacle for a tube C of heavy rubber, which is vulcanized or in any other suitable manner secured within said annular chamber or receptacle. The heavy tube C is adapted to communicate with the interior of the various compartments or cells B, through perforations $d$ communicating with the perforations $b$ in the chambers $a$. A tube D of soft light rubber is inserted in the heavy tube C and is adapted to be sufficiently inflated to close the perforations $d$. Now when it is desired to inflate the tire, air will be forced into the tube C; from which it will pass, through the perforations $d$, into the various compartments or cells simultaneously. When all the compartments shall have been inflated to the desired extent, air will be forced into the light rubber tube D, thereby causing the latter to become inflated and lie close against the inner wall of the heavy tube C, thus closing the openings or perforations in said heavy tube and effectually preventing the escape of air from the various compartments or cells B.

Our improvements are very simple in construction, cheap to manufacture, durable, easy to operate, and are effectual, in every respect, in the performance of their functions.

Having fully described our invention, what we claim as new, and desire to secure by Letters Patent, is—

In a pneumatic tire, the combination with a comparatively thick tire tube substantially circular in cross section and thin elastic cells inside of this tire tube, said elastic cells having recesses therein whereby a continuous annular recess is formed and reinforced edges, of a heavy rubber tube located in the annular recess and having holes therein, communicating with holes into the cells, and a soft light rubber tube inside of the heavy tube adapted to be inflated whereby to close the openings into the cells, substantially as set forth.

In testimony whereof we have signed this specification in the presence of two subscribing witnesses.

HENRY W. O'NEILL.
LUTHER T. HAILE.

Witnesses:
C. E. COOPER.
M. HAMPSON.